Patented Sept. 13, 1938

2,130,014

UNITED STATES PATENT OFFICE 2,130,014

PRODUCTION OF PHTHALIC ESTERS FROM IMPURE PHTHALIC ACID

Alphons O. Jaeger, Greentree, and Herbert J. West, Mount Lebanon, Pa., assignors to American Cyanamid & Chemical Corp., New York, N. Y., a corporation of Delaware No Drawing. Application September 6, 1935, Serial No. 39,502

8 Claims. (Cl. 260—675)

This invention relates to the production of esters of phthalic acid.

In the past, the production of esters of phthalic acid has been rendered difficult by reason of the fact that these esters are normally used as plasticizers for which purpose water white esters having no odor are required. This necessitates producing an ester of extraordinarily high purity because unfortunately impurities in the raw materials used and produced in the esterification reaction possess strong odors and frequently are highly colored. In the past, therefore, it was considered necessary to use raw materials of the very highest purity. In the case of the phthalic anhydride used in esterification, this necessitated purification by distillation, sublimation or both and, of course, raised the cost of the phthalic anhydride used. Even with phthalic anhydride of the very highest purity in which impurities were present in such small traces as to defy analysis, certain impurities were produced in the esterification and an elaborate purification of the ester became necessary. The process formerly used in producing esters from phthalic acid may be considered as involving three main steps: (1) Purification of the crude phthalic anhydride; (2) Esterification of the purified phthalic anhydride with the alcohol, the ester of which is required; (3) Purification of the ester.

The present invention is based on the surprising discovery that by suitable purification of the ester the highest grade of product is obtainable, starting out from crude phthalic anhydride, such as, for example, the so-called converter product, that is to say, the phthalic anhydride condensed from the vapors leaving the converter. Crude phthalic anhydride or acid obtained by leaching various residues such as the so-called still coke from the distillation of crude phthalic anhydride can also be used as well as impure phthalic acid or anhydride obtained as a byproduct from the production of maleic acid from the so-called fume tower liquor obtained by water washing of the fumes from the condenser of the phthalic anhydride converters. The tailings from the condensation of vapors from phthalic anhydride converters is another source of phthalic anhydride which can be used. The present invention performs, therefore, in two steps that which formerly required three and greatly decreases the cost of pure ester, since crude phthalic anhydride such as converter product is considerably cheaper than the highly purified phthalic anhydride which is normally sold in the trade and which was formerly considered essential to the production of high grade esters. The present process also makes available certain by-product phthalic anhydrides and acids which could not be economically purified. Thus, the present process opens an outlet to considerable quantities of impure phthalic acid and phthalic anhydride which would otherwise find no market and which have in the past been discarded.

The present invention is applicable to all esters of phthalic acid with monohydric alcohols. Broadly, the invention is not concerned with particular esters, but has been applied with great success to the commercially important esters such as the methyl, ethyl, propyl, isopropyl, normal butyl and amyl esters. It is, of course, equally applicable to esters of higher alcohols, such as octyl alcohol, ether alcohols such as the monoethylether of ethylene glycol, aromatic alcohols, such as benzyl alcohol, and hydroaromatic alcohols such as cyclohexanol.

While the greatest commercial advantage of the present invention is obtained when it is applied to crude phthalic anhydride or to certain highly impure phthalic anhydrides or acids which could not otherwise be commercially utilized, it should be understood that the invention is generally applicable to impure phthalic anhydrides and present advantages when applied to semi-purified phthalic anhydride. Thus, for example, in the normal purification of phthalic anhydride, employed by the largest producers, the converter product is first distilled and then the distilled product is sublimed. While greater economies are obtained by using converter product of the present invention, it can, of course, be used with distilled product and sometimes the operation of a plant may be such that it is more desirable to use a portion of the distilled product in esterification. In general, throughout the present specification, reference is made to phthalic anhydride and phthalic acid more or less indiscriminantly because from the standpoint of the present process, that is to say, the removal of objectionable impurities in the ester, it is not of particular significance whether a given crude raw material is phthalic anhydride or phthalic acid. From the standpoint of esterification, of course, when the acid is used, the amount of water which has to be removed is doubled.

The invention will be described in greater detail in the specific examples which illustrate typical embodiments. It should be understood that broadly the invention is not limited to a particular purification procedure for it is an important advantage of the present invention that it has been found that purification processes which have been used in the past are capable of removing both the impurities in the crude raw material and those which are produced in the esterification reaction, contrary to the opinion which was universally held in the industry prior to the present invention. In more specific aspects, however, the present invention contemplates improvements in the purification process which reduces the cost and which results in improved products or better yields.

*Example 1*

A kettle provided with heating coils or a heating jacket is charged with 148 parts of crude phthalic anhydride converter product together with 173.5 parts of 100% normal butyl alcohol and .37 part of 66° Bé. sulfuric acid. The kettle is heated and the excess alcohol and water distilled off through a suitable distilling column as the reaction proceeds, the alcohol being continuously separated from the water and returned to the kettle. When esterification is complete, which will vary of course with the design of apparatus, hydrated lime is added to the esterification mixture to just neutralize the free acid and unreacted alcohol is then removed by steam distillation.

The crude ester is highly colored, including a red dye which is always present as an impurity in phthalic anhydride converter product and which is ordinarily believed to be a condensation product of alphanaphthaquinone. Other impurities present possess a strong odor. To the crude ester is added decolorizing carbon with agitation and then air is blown through to remove water introduced by the steam distillation. The aeration also appears to remove most of the impurities which possess strong odor and the decolorizing carbon appears to absorb the colored impurities including the red dye. The ester is then filtered from the decolorizing carbon and the filtrate vacuum distilled. Substantially colorless and practically odorless ester is produced, the small amount of color which is not absorbed by the decolorizing carbon remaining behind in the still.

Where an ester of the very highest purity is desired, or where unusually impure converter product is employed, it is sometimes desirable to treat the distilled ester with lime to neutralize any remaining acidity, whereupon fresh decolorizing carbon is stirred in and the batch again blown with air and filtered.

*Example 2*

Still coke residue resulting from the distillation of crude phthalic anhydride at temperatures above 350° C. with or without the presence of condensing agents, or a softer tar which is obtained when the distillation takes place at lower temperatures, is leached with water or a dilute alkali such as ammonia as described in the patent to Daniels No. 1,851,383. The phthalic acid or ammonium phthalate obtained contains large amounts of the red dye referred to in the preceding example, the amounts being very greatly in excess of that present in ordinary converter product. Free phthalic acid is liberated with sulfuric acid (in case the leaching has been with an alkali) and is separated from the water solution by cold filtration. The wet press cake is dried with hot air and 166 parts are introduced into a kettle as described in Example 1, together with 207 parts of 100% normal amyl alcohol or mixed amyl alcohols, sold under the trade name "Pentasol", and .5 part of 66° Bé. sulfuric acid. The esterification and purification is carried out as described in Example 1 but if a slight trace of color remains, due to the excessive concentration of colored impurities, the final product may, if desired, be bleached with a solution in water or acetone of potassium or sodium permanganate. Where large amounts of the red dye are present, additional care should be exercised in neutralization as a sufficient excess of lime reacts with the red dye and facilitates its removal by decolorizing carbon. Aluminum hydroxide, preferably freshly precipitated, also gives good results when it is used in place of lime or in conjunction therewith. Other lake forming metal compounds may likewise be used.

*Example 3*

166 parts of impure phthalic acid recovered as a by-product in the production of maleic acid by the process described in the copending applications of Jaeger and Jewett Serial No. 50,838, filed November 21, 1935, and Serial No. 50,839, filed November 21, 1935 is charged into a kettle together with 173.5 parts of secondary butyl alcohol and 1.85 parts of 66° Bé. sulfuric acid. The esterification and purification proceeds as described in Example 1, but inasmuch as the impure phthalic acid is lower in color than that used in Example 2, it is normally unnecessary to bleach the product with permanganate.

*Example 4*

148 parts of semipurified phthalic anhydride obtained by distillation of converter product is charged into a still with 235 parts of 100% cyclohexanol and .37 part of 66° Bé. sulfuric acid. The esterification and purification proceeds as in Example 1, except that it is normally not necessary to subject the distilled ester to a second treatment with decolorizing carbon.

*Example 5*

148 parts of crude phthalic anhydride converter product is charged into a jacketed kettle together with 294 parts of 95% ethyl alcohol. The mixture is heated to about 130° C. with an efficient distilling column, removing 95% alcohol from the top of the column and returning it to the reaction mixture, water being removed from the lower parts of the column. A conversion of 90% is obtained in 9 hours which reaches 94% conversion in 21 hours. If complete conversion is desired, it becomes necessary to add about 88 parts of absolute alcohol which carries the conversion to more than 98%.

The esterification mixture is then neutralized and purified as described in Example 1. The choice as to whether the absolute alcohol is to be used depends on the economics of the situation. The quality of the ester obtained is the same in both cases but where esterification is stopped below 98% it is desirable to wash out residual acids with caustic soda solution. The method of esterification with 95% ethyl alcohol is not claimed per se in the present application but forms the subject matter of the copending application by H. J. West and A. O. Jaeger Serial No. 39,503 filed September 6, 1935.

In the specific examples, decolorizing carbon has been described. This has been found to be the best decolorizing adsorbent for general use. However, it should be understood that the invention is not limited thereto, and other decolorizing adsorbents may be substituted for the decolorizing carbon in part or in whole. While the decolorizing adsorbent can be used alone it is preferably employed after the major portion of the red dye has been fixed by reaction with lake forming metal compounds.

What we claim is:

1. A method of producing commercial colorless and odorless esters of phthalic acid which comprises esterifying a substance included in the group consisting of phthalic acid and phthalic anhydride containing substantial amounts of color and odor-forming impurities which are of the type present in a crude converter product with a monohydric alcohol to produce a neutral ester, subjecting the ester to a decolorizing and deodorizing treatment included in the group consisting of aeration, treatment with adsorbents and chemical bleaching, the treatment not essentially differing in degree from that normally used in purifying corresponding esters produced by the esterification of commercial pure phthalic anhydride and recovering the ester by distillation.

2. A method of producing commercial colorless and odorless esters of phthalic acid which comprises esterifying a crude converter product phthalic anhydride with a monohydric alcohol to produce a neutral ester, subjecting the ester to a decolorization and deordorization treatment consisting of at least one process of the group consisting of aeration, treatment with decolorizing adsorbents and chemical bleaching and further purifying the ester by distillation, the decolorizing and deodorizing treatment not essentially differing in degree from that normally used in decolorizing and deodorizing the corresponding ester produced by esterification of commercial, pure phthalic anhydride.

3. A method of producing commercial colorless and odorless esters of phthalic acid which comprises esterifying an impure phthalic acid obtained by leaching phthalic anhydride still residues with a monohydric alcohol to produce a neutral ester, subjecting the ester to a decolorization and deodorization treatment consisting of at least one process of the group consisting of aeration, treatment with decolorizing adsorbents and chemical bleaching and further purifying the ester by distillation, the decolorizing and deodorizing treatment not essentially differing in degree from that normally used in decolorizing and deodorizing the corresponding ester produced by esterification of commercial, pure phthalic anhydride.

4. A method according to claim 1 in which the decolorizing and deodorizing treatment includes treatment with both a decolorizing adsorbent and aeration.

5. A method of producing commercial colorless and odorless esters of phthalic acid which comprises esterifying a crude converter product phthalic anhydride with a monohydric alcohol to produce a neutral ester, removing water of esterification by azeotropic distillation with the said alcohol, decolorizing the ester by means of a decolorizing adsorbent, removing odors by aeration and further purifying the ester by vacuum distillation, the decolorizing and deodorizing treatment not essentially differing in degree from that normally used in decolorizing and deodorizing the corresponding ester produced by esterification of commercial, pure phthalic anhydride.

6. A method of producing commercial colorless and odorless esters of phthalic acid which comprises esterifying an impure phthalic acid obtained by leaching phthalic anhydride still residues with a monohydric alcohol to produce a neutral ester, removing water of esterification by azeotropic distillation with the said alcohol, decolorizing the ester by means of a decolorizing adsorbent, removing odors by aeration and further purifying the ester by vacuum distillation, the decolorizing and deodorizing treatment not essentially differing in degree from that normally used in decolorizing and deodorizing the corresponding ester produced by esterification of commercial, pure phthalic anhydride.

7. A method according to claim 5 in which the crude ester mixture is neutralized with a base to substantial neutrality without producing a sufficiently alkaline condition to exert solvent action on colored impurities.

8. A method according to claim 6 in which the crude ester mixture is neutralized with a base to substantial neutrality without producing a sufficiently alkaline condition to exert solvent action on colored impurities.

ALPHONS O. JAEGER.
HERBERT J. WEST.